United States Patent Office

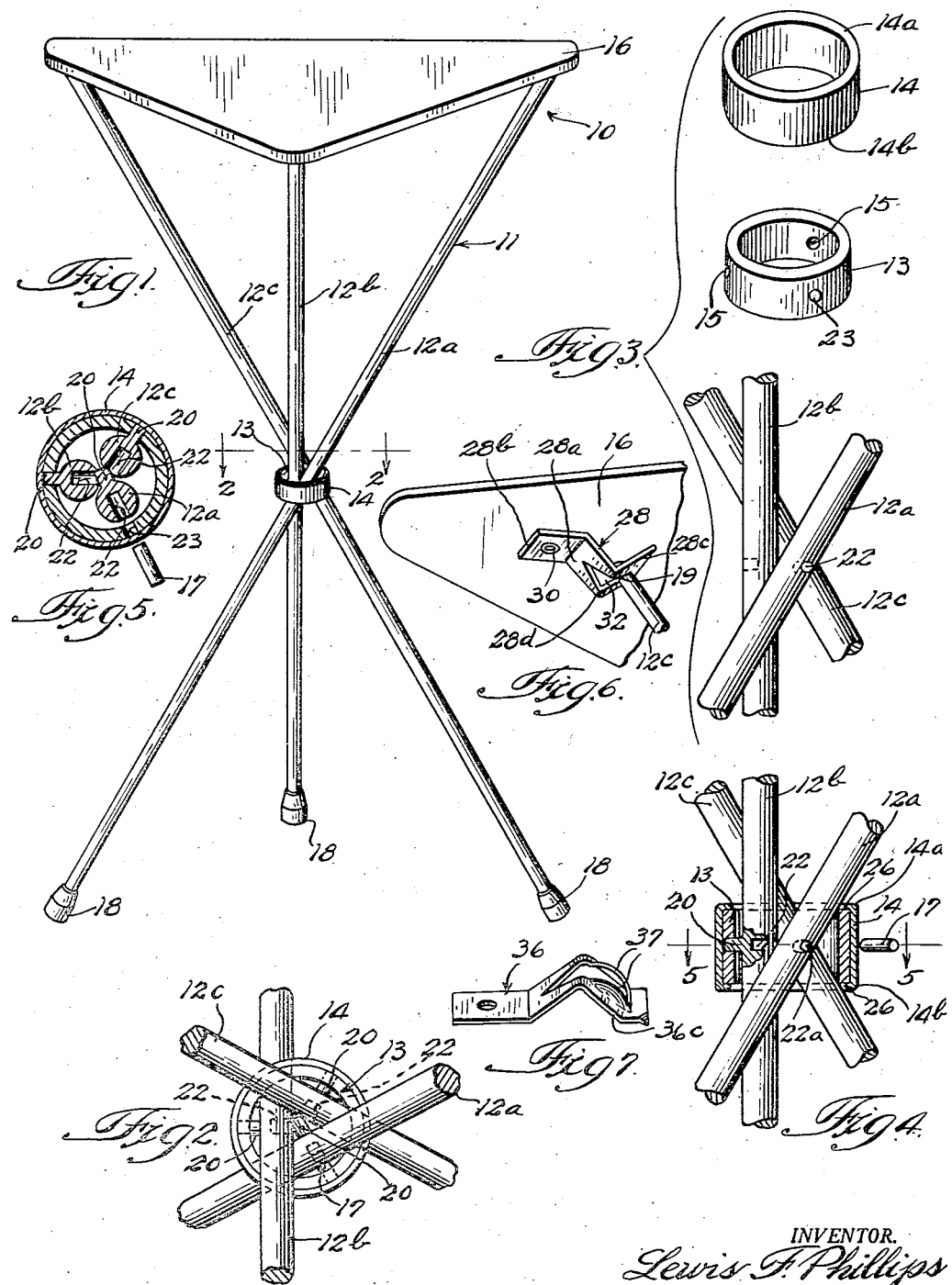

2,803,419
Patented Aug. 20, 1957

2,803,419

FOLDABLE FRAME

Lewis F. Phillips, Chicago, Ill.

Application February 21, 1955, Serial No. 489,418

4 Claims. (Cl. 248—164)

This invention relates to a collapsible table and, more particularly, to a table utilizing a foldable stand and a detachable top, and is a continuation-in-part of my copending application Serial No. 421,903, filed April 8, 1954, now Patent No. 2,710,733, granted June 14, 1955.

Various structures of the proposed type are well known in the art, but, because of their particular structural design, they are possessed of one or more shortcomings, such as, for example, difficulty of assembly or disassembly, expensive and delicate construction, or bulkiness in design, thereby rendering such a device, when in a disassembled state, unsuitable for storage, particularly where only limited storage space is available.

It is an object, therefore, of the present invention to provide a collapsible table or the like which may be readily assembled and disassembled with a minimum of time and effort.

It is a further object of this invention to provide a collapsible table having a foldable table top supporting structure which is composed of a minimum number of parts, thereby facilitating storage of the table, when in a collapsed state.

It is a further object of this invention to provide a collapsible table which is possessed of a high degree of stability when in assembled relation.

It is a still further object of this invention to provide a novel and facile method of attaching a foldable frame to a table top or the like whereby the frame and top are held against accidental detachment, thereby facilitating moving of the table when in assembled condition.

It is a further object of this invention to provide a foldable table which is simple, yet sturdy in construction, inexpensive to produce, and is pleasing in appearance.

Further and additional objects will become more apparent from the description, accompanying drawings and appended claims.

In accordance with one embodiment of this invention, a foldable table is provided which comprises a foldable frame possessed of a plurality of elongated legs of substantially the same construction operatively connected to one another intermediate their ends by a collar, which encompasses the legs and permits limited relative movement thereof. Each frame leg has a transversely projecting stud or pin disposed within the portion of the leg encompassed by the collar and a pocket positioned in axial alignment with the pin. All but one of the legs have the studs thereof disposed within symmetrically arranged apertures formed in the encompassing collar. The stud of the one leg, however, has the distal end thereof partially disposed within the pockets of the other legs of the frame. The pocket of the one leg, in turn, is aligned with respect to an aperture in the collar and is adapted to accommodate a removable pin which retains the legs in assembled relation and prevents relative longitudinal movement of the legs with respect to one another. The removable pin is held in assembled relation with the leg pocket and collar aperture by a ringlike cover piece which encircles the collar. The upper corresponding ends of the assembled legs are adapted to engage clip members affixed to and symmetrically arranged about the underside of a table top and to cooperate therewith to retain the frame and table top in assembled relation. The clip member and the upper end of the corresponding leg are held in assembled relation by spring tension which is effected by reason of the size and relative disposition of the collar with respect to the frame legs and the relative disposition of the clip members with respect to the axis or centerline of the collar.

For a more complete understanding of the invention, reference should be made to the drawings, wherein:

Figure 1 is a perspective view of a collapsible table in assembled relation;

Fig. 2 is a fragmentary view taken on line 2—2 of Fig. 1;

Fig. 3 is a fragmentary perspective view of the foldable frame shown in Fig. 1, with the collar and cover piece thereof shown in exploded relation;

Fig. 4 is a fragmentary view, partially in section, showing the manner in which the frame legs are maintained in assembled relation;

Fig. 5 is a sectional view taken on line 5—5 of Fig. 4;

Fig. 6 is a fragmentary view showing the manner in which a frame leg engages a clip member affixed to the underside of the table top; and Fig. 7 illustrates a modified form of clip member.

Referring now to the drawings and, more particularly, to Fig. 1, an improved collapsible table 10 is illustrated which comprises a planar top piece 16 and a foldable frame 11, the latter being adapted, when in unfolded condition, to support the piece 16 in a substantially horizontal plane. The frame 11 in this instance is constructed preferably of three elongated legs 12a, 12b, and 12c of uniform size and length which are assembled in clustered relation and are operatively connected to one another intermediate their ends by an encompassing collar 13. Each of the legs has affixed to its lower end limit a footing 18, which is preferably formed of rubber or any other suitable nonslipping material. The upper or opposite end limit of each frame leg, as seen in Fig. 6, is provided with a peripheral groove 19 which substantially encompasses the leg end and is spaced a short distance from the tip of the leg. The function of the groove will become apparent from the discussion to follow hereinafter.

In Fig. 5 it will be noted that two of the three frame legs, namely, 12b and 12c, are provided with stud or pin portions 20 which are adapted to be journalled in a pair of relatively spaced apertures 15 formed in collar 13 so that each leg may pivot to a limited degree relative to the collar and other legs to a folded or unfolded position.

The stud portion of each leg projects in a direction normal to the longitudinal axis of the leg and, in this instance, is formed by extruding the stud portion directly from the leg cross section. The location of the stud portion relative to the axial length of the leg will be determined by factors which will be discussed more fully hereinafter.

The extrusion process concomitantly forms in each leg a recess or elongated pocket 22 which is disposed on the opposite side of the leg and in axial alignment with the stud portion 20. When the legs 12b and 12c are in assembled relation, the pockets 22 thereof are disposed adjacent the centerline of collar 13 and are adapted to partially accommodate the stud portion 20 of leg 12a and thereby prevent relative longitudinal movement of the legs 12a, 12b, and 12c with respect to one another.

Third leg 12a has the pocket 22 thereof disposed so as to be in alignment with an aperture 23 formed in collar 13. The aperture 23 is disposed substantially equidistant from the apertures 15, heretofore mentioned, formed in collar 13. Aligned pocket and aperture 23 are adapted to receive a removable pin 17 which is inserted in a radial direction from the outside of collar 13.

The three legs 12a, 12b, and 12c, removable pin 17, and collar 13 are maintained in assembled relation by means of an annular cover 14 which is adapted to encompass the outside of collar 13. The upper and lower edges 14a and 14b of cover 14 are adapted, once the cover is in proper relative encompassing position with respect to collar 13, to be bent or peened inwardly to form flanges 26, thereby locking the collar and cover in assembled relation. If desired, one flange 26 may be preformed so as to expedite assembly of the device.

To effect attachment of the frame legs to a table top 16 or similar article, a plurality of clips 28 are provided which are symmetrically arranged on the underside of the top and are affixed thereto by rivets 30 or any other suitable means. Each clip 28 is provided, in this instance, with an elongated body formed of resilient sheet material which has been bent so as to form a center section 28a and a pair of end sections 28b and 28c integral therewith, see Fig. 6. End section 28b is disposed outwardly from the centerline of top 16 and is secured thereto by rivet 30. Center section 28a and end section 28c, on the other hand, are angularly disposed with respect to one another and have the juncture 28d formed between the sections spaced from the underside of the top. Sections 28a and 28c are provided with a common aperture or slot 32. The portion of the slot 32 aligned with juncture 28d is the largest part of the slot and is adapted to permit the upper end limit of the frame leg to be inserted therein. The portion of the slot disposed within end section 28c narrows from juncture 28d and is adapted to have the grooved end of the leg become wedged within the slot 32, when the top 16 and frame 11 are assembled. This wedging action results by reason of the three clip members 28 which describe a triangular-shaped area slightly larger in size than the triangular-shaped area described by the three end limits of the legs when the latter are in their normal unfolded relation. Consequently, to enable the slotted end limits of the legs to engage the slots 32 of the clip members, the legs must be sprung outwardly a slight amount so as to permit the ends of the legs to be inserted through the slots. Once the ends of the legs have been inserted through the slots, the legs will tend to return to their normal unfolded position but will be restrained from so doing by the slots 32. The groove 19 in each leg end is adapted to accommodate the sides of the slot and thereby effect interlocking of the leg and clip. The legs employed in the illustrated assembly are constructed of a resilient metal, plastic, or other suitable material so as to permit ready spreading of the upper end limits of the legs during assembly or disassembly of the table. The amount of spring tension which will be utilized to hold the frame and top in assembled relation will depend upon the inner diameter and axial length of collar 13, the size triangle described by clip members 28, and the location of the collar on the legs. As noted in Fig. 1, it is preferred to have the collar 13 disposed slightly above the center point of each leg.

As will be noted from Fig. 6, to disengage the frame from the table top 16, any of the three legs, such as leg 12c, is sprung outwardly a slight amount until the grooved leg end limit becomes unwedged from the slot 32, whereupon the leg end limit may be withdrawn from the slot. The remaining two legs are then capable of being disengaged by tilting the top piece 16 relative to the legs. Once the three legs are free of the top 16, they may be brought or folded into parallel relationship and readily stored in a small storage space along with the top 16.

Fig. 7 depicts a modified form of clip 36 which is substantially the same construction as clip 28, except the slot-forming portions 37 of the inwardly disposed end section 36c bulge outwardly a slight amount, thereby facilitating disengagement of the top 16 and frame 11 by enabling the tip of the leg to ride out of the slot upon tilting of the top relative to the engaged end limits of two of the legs. In addition, the bulging portions of section 36c provide greater rigidity and strength for the clip member. Other forms of clip members may be utilized, if desired, which effect positive engagement with the end limits of the legs, without departing from the scope of this invention.

While in the drawings only three legs are shown, it is understood, of course, that more than three legs may be utilized, if desired, depending upon the cross-sectional area of the collar 13 and the size of the table top 16 to be supported, without departing from the scope of the invention. In addition, the shape of the table top 16 may be of configurations other than that shown in Fig. 1, so as to meet various interior-decorating schemes.

Thus, it is seen that a collapsible table which is readily assembled has been provided which engages a table top or similar article by means of a novel self-induced spring tension and thereby retains the table in assembled relation. Furthermore, the illustrated construction readily disassembles into a compact unit facilitating storage and transportation thereof.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A foldable frame having a plurality of elongated elements, each element being pivotal relative to the other elements and provided with an exteriorly accessible opening and a projecting stud positioned on each of said elongated elements and in alignment with said opening, apertured collar means maintaining said elongated elements in a substantially clustered arrangement and accommodating the projecting studs of all of said elements but one, the projecting stud of said one element being accommodated by the openings of said other elements, and a removable pin having one end thereof disposed within the opening of said one element and the other end thereof disposed within an aperture formed in said collar means.

2. A foldable frame having a plurality of elongated elements, each element being pivotal relative to the other elements and provided with an exteriorly accessible opening and a projecting stud positioned on each of said elongated elements and in alignment with said opening, apertured collar means maintaining said elongated elements in a substantially clustered arrangement and accommodating the projecting studs of all of said elements but one, the projecting stud of said one element being accommodated by the openings of said other elements, a removable pin having one end thereof disposed within the opening of said one element and the other end thereof disposed within an aperture formed in said collar means, and a cover encircling said collar means to effect locking of the removable pin in said collar aperture.

3. A foldable frame having at least three uniform elongated elements each having a transversely projecting stud and an oppositely disposed opening formed thereon intermediate the ends of said elements, an apertured collar encompassing said elongated elements for maintaining the latter in a substantially clustered arrangement, two of said elements having the studs thereof pivotally engaging and disposed within apertures in said collar, the stud of said third element pivotally engaging and being partially disposed within the openings of said two elements, and a tray member supported by said elongated elements and having resilient clip members affixed to the underside of said tray and equal in number to said elongated elements, a portion of each clip member being spaced from said tray underside and having a V-shaped slot formed therein for accommodating under tension the upper end portions of said elongated elements when said frame and tray member are in assembled relation.

4. The combination as defined in claim 1 in which the opening provided in each element is axially aligned with the projecting stud formed on said element.

References Cited in the file of this patent

UNITED STATES PATENTS

| | | |
|---|---|---|
| 382,308 | Kamerer | May 8, 1888 |
| 509,005 | Voeltzkow | Nov. 21, 1893 |
| 583,013 | Ebert | May 18, 1897 |
| 759,777 | Usher | May 10, 1904 |
| 1,262,356 | Kirkland | Apr. 9, 1918 |
| 1,338,124 | Dale | Apr. 27, 1920 |
| 1,355,944 | Dale | Oct. 19, 1920 |
| 1,845,921 | Karworski | Feb. 16, 1932 |
| 1,940,565 | Schott | Dec. 19, 1933 |
| 2,501,746 | Shoenberg | Mar. 28, 1950 |
| 2,673,775 | Silverman | Mar. 30, 1954 |
| 2,710,733 | Phillips | June 14, 1955 |